United States Patent
Sethi et al.

(10) Patent No.: US 12,423,163 B2
(45) Date of Patent: Sep. 23, 2025

(54) CONTEXT DRIVEN NETWORK SLICING BASED MIGRATION OF APPLICATIONS AND THEIR DEPENDENCIES

(71) Applicant: Dell Products L.P., Round Rock, TX (US)

(72) Inventors: Parminder Singh Sethi, Ludhiana (IN); Lakshmi Nalam, Bengaluru (IN); Shelesh Chopra, Bangalore (IN)

(73) Assignee: Dell Products L.P., Round Rock, TX (US)

( * ) Notice: Subject to any disclaimer, the term of this patent is extended or adjusted under 35 U.S.C. 154(b) by 282 days.

(21) Appl. No.: 17/871,547

(22) Filed: Jul. 22, 2022

(65) Prior Publication Data

US 2024/0028420 A1    Jan. 25, 2024

(51) Int. Cl.
*G06F 9/50*    (2006.01)
*G06F 9/48*    (2006.01)

(52) U.S. Cl.
CPC .......... *G06F 9/5088* (2013.01); *G06F 9/4881* (2013.01)

(58) Field of Classification Search
CPC .............................. G06F 9/5088; G06F 9/4881
See application file for complete search history.

(56) References Cited

U.S. PATENT DOCUMENTS

| | | |
|---|---|---|
| 6,105,035 A | 8/2000 | Monge |
| 6,195,760 B1 | 2/2001 | Chung et al. |
| 6,393,480 B1 | 5/2002 | Qin |
| 6,563,836 B1 * | 5/2003 | Capps ................ G06F 9/544 709/215 |
| 7,251,745 B2 | 7/2007 | Koch et al. |
| 7,401,248 B2 | 7/2008 | Nakahara et al. |
| 7,525,749 B2 | 4/2009 | Maejima et al. |
| 7,590,981 B2 | 9/2009 | Gupta et al. |
| 7,966,391 B2 | 6/2011 | Anderson et al. |

(Continued)

FOREIGN PATENT DOCUMENTS

| | | |
|---|---|---|
| CN | 106649091 A | 5/2017 |
| WO | 2021122516 A1 | 6/2021 |
| WO | 2022104396 A1 | 5/2022 |

OTHER PUBLICATIONS

Steven D. Young, "In-Time Safety Assurance Systems for Emerging Autonomous Flight Operations", pp. 1-10, https://ieeexplore.ieee.org/stamp/stamp.jsp?tp=&arnumber=8569689 (Year: 2018) (10 pages).

(Continued)

*Primary Examiner* — Lewis A Bullock, Jr.
*Assistant Examiner* — Jordan Scott Motter
(74) *Attorney, Agent, or Firm* — Chamberlain, Hrdlicka, White, Williams & Aughtry; Aly Z. Dossa

(57) ABSTRACT

Embodiments described herein relate to methods, systems, and non-transitory computer readable mediums storing instructions for creating and executing migration workflows to replicate or migrate data (collectively referred to herein as 'migration') from one device or set of devices to another device or set of devices (e.g., from one computing environment to another). The method of migration involves using a slicing customizer to assign the applications, or parts of the applications, to network slice queues based on predetermined rules. The slices in the queues are then migrated by a network slicing controller.

20 Claims, 7 Drawing Sheets

(56) References Cited

U.S. PATENT DOCUMENTS

| | | |
|---|---|---|
| 8,078,448 B1 | 12/2011 | Wohlberg et al. |
| 8,364,799 B2 | 1/2013 | Sakai |
| 8,918,673 B1 | 12/2014 | Rangaiah et al. |
| 9,015,832 B1 | 4/2015 | Lachwani et al. |
| 9,026,260 B1 | 5/2015 | Thornley et al. |
| 9,397,930 B2 | 7/2016 | Drobinsky et al. |
| 9,417,918 B2 | 8/2016 | Chin |
| 9,514,164 B1 | 12/2016 | Matic |
| 9,515,873 B2* | 12/2016 | Anumala .............. H04L 41/344 |
| 9,900,215 B2 | 2/2018 | Yang et al. |
| 10,303,465 B1 | 5/2019 | Potter |
| 10,572,294 B1 | 2/2020 | Chawda et al. |
| 10,785,123 B2 | 9/2020 | Gonguet |
| 11,392,402 B1 | 7/2022 | Carroll |
| 11,424,989 B2 | 8/2022 | Jeuk et al. |
| 11,588,893 B1 | 2/2023 | Sharma |
| 11,595,269 B1 | 2/2023 | Ghosh et al. |
| 11,846,918 B1 | 12/2023 | Mazur |
| 2002/0095474 A1 | 7/2002 | Boys |
| 2002/0138226 A1 | 9/2002 | Doane |
| 2003/0233230 A1 | 12/2003 | Ammicht |
| 2003/0236819 A1* | 12/2003 | Greubel .................. H04L 9/40 709/201 |
| 2005/0216800 A1 | 9/2005 | Bicknell et al. |
| 2005/0257090 A1 | 11/2005 | Santos |
| 2006/0031842 A1* | 2/2006 | Neiman .................. G06F 9/505 718/103 |
| 2006/0129771 A1 | 6/2006 | Dasgupta et al. |
| 2007/0079170 A1 | 4/2007 | Zimmer et al. |
| 2007/0198524 A1 | 8/2007 | Branda et al. |
| 2007/0198968 A1 | 8/2007 | Shenfield |
| 2008/0222218 A1 | 9/2008 | Richards et al. |
| 2009/0157882 A1 | 6/2009 | Kashyap |
| 2009/0265449 A1* | 10/2009 | Krishnappa ........... G06F 9/5061 709/224 |
| 2009/0307522 A1 | 12/2009 | Olson et al. |
| 2011/0087672 A1 | 4/2011 | Hui |
| 2011/0113224 A1 | 5/2011 | Isshiki et al. |
| 2011/0251998 A1 | 10/2011 | Moore |
| 2011/0307903 A1 | 12/2011 | Vaddagiri |
| 2012/0054581 A1* | 3/2012 | Grube .................. G06F 3/0679 714/769 |
| 2012/0072571 A1 | 3/2012 | Orzell et al. |
| 2012/0089711 A1 | 4/2012 | Zager |
| 2012/0151061 A1 | 6/2012 | Bartfai-Walcott |
| 2012/0254849 A1 | 10/2012 | Wang |
| 2013/0103977 A1 | 4/2013 | Zimmermann |
| 2013/0346714 A1 | 12/2013 | Solihin |
| 2014/0172782 A1 | 6/2014 | Schuenzel |
| 2014/0376385 A1 | 12/2014 | Boss et al. |
| 2015/0169329 A1 | 6/2015 | Barrat |
| 2015/0222702 A1 | 8/2015 | Salle |
| 2015/0261518 A1 | 9/2015 | Viswanathan |
| 2015/0278219 A1 | 10/2015 | Phipps |
| 2015/0347573 A1 | 12/2015 | Hosokawa |
| 2016/0162280 A1 | 6/2016 | Murayama et al. |
| 2016/0239395 A1 | 8/2016 | Madsen et al. |
| 2016/0266875 A1 | 9/2016 | Takahashi |
| 2016/0359678 A1* | 12/2016 | Madani ................. G06F 16/122 |
| 2016/0378525 A1 | 12/2016 | Bjorkengren |
| 2016/0378648 A1 | 12/2016 | Ekambaram |
| 2017/0046202 A1* | 2/2017 | Bao ........................ G06F 9/50 |
| 2017/0337088 A1 | 11/2017 | Wang |
| 2017/0359414 A1 | 12/2017 | Sengupta et al. |
| 2018/0046489 A1 | 2/2018 | Onoue |
| 2018/0074855 A1* | 3/2018 | Kambatla ............. G06F 9/4881 |
| 2018/0113728 A1 | 4/2018 | Musani et al. |
| 2018/0124182 A1 | 5/2018 | Orman |
| 2018/0157723 A1 | 6/2018 | Chougule |
| 2018/0196655 A1 | 7/2018 | Kapoor et al. |
| 2018/0262979 A1 | 9/2018 | Wang et al. |
| 2018/0322276 A1 | 11/2018 | Brown |
| 2019/0087224 A1* | 3/2019 | Vrind .................... G06F 9/4818 |
| 2019/0104019 A1 | 4/2019 | Makovsky |
| 2019/0199687 A1 | 6/2019 | Lan |
| 2019/0310872 A1 | 10/2019 | Griffin |
| 2019/0311041 A1 | 10/2019 | Shah |
| 2019/0379595 A1 | 12/2019 | Ur et al. |
| 2020/0028904 A1 | 1/2020 | Delbecq et al. |
| 2020/0099773 A1 | 3/2020 | Myers |
| 2020/0100323 A1* | 3/2020 | Zhou .................. H04L 65/1069 |
| 2020/0110655 A1 | 4/2020 | Harwood et al. |
| 2020/0133772 A1 | 4/2020 | Dalmatov et al. |
| 2020/0156243 A1 | 5/2020 | Ghare et al. |
| 2020/0169921 A1* | 5/2020 | Zhu ........................ H04W 8/02 |
| 2020/0264930 A1 | 8/2020 | Mandagere et al. |
| 2020/0344658 A1 | 10/2020 | Huang |
| 2020/0349238 A1 | 11/2020 | Tyagi |
| 2020/0366604 A1 | 11/2020 | Banerjee et al. |
| 2021/0064401 A1 | 3/2021 | Vichare |
| 2021/0153044 A1 | 5/2021 | Ramanathan et al. |
| 2021/0165768 A1 | 6/2021 | D'halluin et al. |
| 2021/0200814 A1 | 7/2021 | Tal |
| 2021/0373947 A1 | 12/2021 | Kweon |
| 2022/0070648 A1 | 3/2022 | Krishan |
| 2022/0075613 A1 | 3/2022 | Ramachandran |
| 2022/0091980 A1* | 3/2022 | Kayiran ............. G06F 13/1668 |
| 2022/0138081 A1 | 5/2022 | Varma et al. |
| 2022/0158926 A1 | 5/2022 | Wennerström et al. |
| 2022/0164186 A1 | 5/2022 | Pamidala |
| 2022/0167363 A1* | 5/2022 | Sun ........................ H04W 48/18 |
| 2022/0171856 A1 | 6/2022 | Bhatt |
| 2022/0179683 A1 | 6/2022 | Verma et al. |
| 2022/0206842 A1 | 6/2022 | Sahita et al. |
| 2022/0229573 A1 | 7/2022 | Ramasamy |
| 2022/0240105 A1 | 7/2022 | Shaw |
| 2022/0272142 A1 | 8/2022 | Li et al. |
| 2022/0283784 A1 | 9/2022 | Degen et al. |
| 2022/0334870 A1 | 10/2022 | Chen |
| 2022/0337493 A1 | 10/2022 | Sant et al. |
| 2022/0337501 A1 | 10/2022 | Sant et al. |
| 2022/0342697 A1 | 10/2022 | Macfarlane |
| 2022/0368602 A1 | 11/2022 | Adhav et al. |
| 2022/0413845 A1 | 12/2022 | Mathew |
| 2023/0033886 A1 | 2/2023 | Goswami et al. |
| 2023/0037124 A1 | 2/2023 | Mengwasser et al. |
| 2023/0080047 A1 | 3/2023 | Bashir |
| 2023/0098941 A1 | 3/2023 | Rizzi et al. |
| 2024/0037011 A1 | 2/2024 | Zheng |

OTHER PUBLICATIONS

Wu, Suzhen et al., Proactive Data Migration for Improved Storage Availability in Large-Scale Dat Centers, Sep. 2015, IEEE (15 pages).

Mona Elsaadawy et al., Enabling efficient application monitoring in cloud data centers using SDN, 1902.11292, 14 pages, Year: 2019.

* cited by examiner

CONTEXT DRIVEN NETWORK SLICING BASED MIGRATION OF APPLICATIONS AND THEIR DEPENDENCIES

BACKGROUND

Computing devices often exist in environments that include many such devices (e.g., servers, virtualization environments, storage devices, network devices, etc.). Such environments may, from time to time, in whole or in part, require being replicated (e.g., backed-up) and/or migrated (e.g., moved from one set of devices to another). Such replications and/or migrations often require large amounts of investigation, coordination, time, and manual steps to be performed by any number of system administrators.

SUMMARY

In general, embodiments described herein relate to a method for performing a migration. The method includes identifying properties of the applications and assigning a priority to each of the applications based on their properties. The method then places the applications in appropriate network slice queues based on each application's assigned priorities, and the method performs, by the network slicing controller, the migration using the network slice queues.

In general, embodiments described herein relate to a non-transitory computer readable medium comprising computer readable program code. The computer readable code, which when executed by a computer processor, enables the computer processor to perform a method for performing a migration. The method includes identifying properties of the applications and assigning a priority to each of the applications based on their properties. The method then places the applications in appropriate network slice queues based on each application's assigned priorities, and the method performs, by the network slicing controller, the migration using the network slice queues.

In general, embodiments described herein relate to a system which includes at least two devices and a migrator. The migrator includes at least one processor, a storage device, and a memory. The memory includes instructions, which when executed by the processor perform a method for performing a migration of a plurality of applications between a first environment and at least a second environment. The method includes identifying properties of the applications and assigning a priority to each of the applications based on their properties. The method then places the applications in appropriate network slice queues based on each application's assigned priorities, and the method performs, by the network slicing controller, the migration using the network slice queues.

Other aspects of the embodiments disclosed herein will be apparent from the following description and the appended claims.

BRIEF DESCRIPTION OF DRAWINGS

Certain embodiments of the invention will be described with reference to the accompanying drawings. However, the accompanying drawings illustrate only certain aspects or implementations of the invention by way of example and are not meant to limit the scope of the claims.

DETAILED DESCRIPTION

Figure 1A:
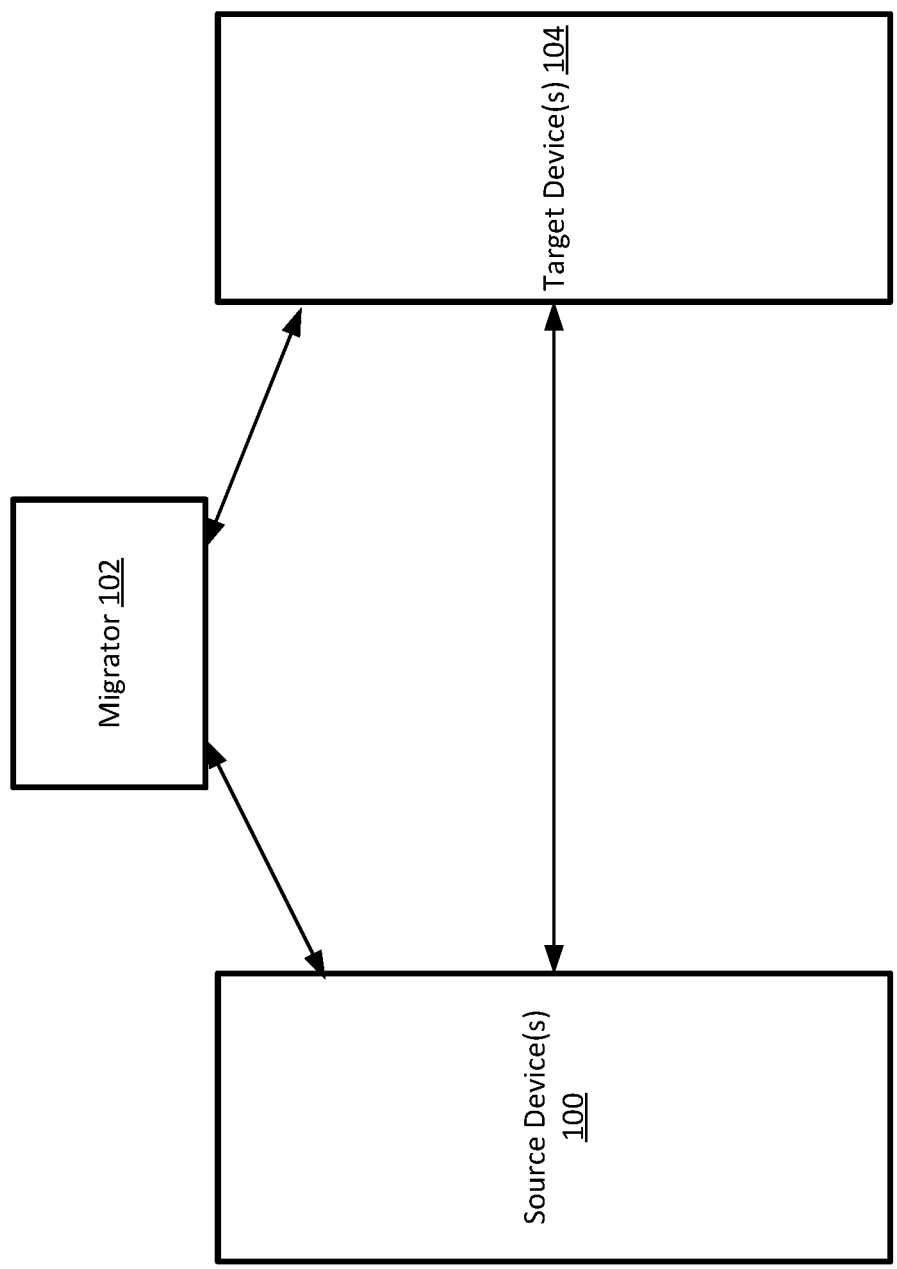
FIG. 1A shows a diagram of a system in accordance with one or more embodiments of the invention.

In the below description, numerous details are set forth as examples of embodiments described herein. It will be understood by those skilled in the art, and having the benefit of this Detailed Description, that one or more embodiments of embodiments described herein may be practiced without these specific details and that numerous variations or modifications may be possible without departing from the scope of the embodiments described herein. Certain details known to those of ordinary skill in the art may be omitted to avoid obscuring the description.

In the below description of the figures, any component described with regard to a figure, in various embodiments described herein, may be equivalent to one or more like-named components described with regard to any other figure. For brevity, descriptions of these components will not be repeated with regard to each figure. Thus, each and every embodiment of the components of each figure is incorporated by reference and assumed to be optionally present within every other figure having one or more like-named components. Additionally, in accordance with various embodiments described herein, any description of the components of a figure is to be interpreted as an optional embodiment, which may be implemented in addition to, in conjunction with, or in place of the embodiments described with regard to a corresponding like-named component in any other figure.

Throughout the application, ordinal numbers (e.g., first, second, third, etc.) may be used as an adjective for an element (i.e., any noun in the application). The use of ordinal numbers is not to imply or create any particular ordering of the elements nor to limit any element to being only a single element unless expressly disclosed, such as by the use of the terms "before", "after", "single", and other such terminology. Rather, the use of ordinal numbers is to distinguish between the elements. By way of an example, a first element is distinct from a second element, and the first element may encompass more than one element and succeed (or precede) the second element in an ordering of elements.

As used herein, the phrase operatively connected, or operative connection, means that there exists between elements/components/devices a direct or indirect connection that allows the elements to interact with one another in some way. For example, the phrase 'operatively connected' may refer to any direct (e.g., wired directly between two devices or components) or indirect (e.g., wired and/or wireless connections between any number of devices or components connecting the operatively connected devices) connection. Thus, any path through which information may travel may be considered an operative connection.

In general, embodiments described herein relate to methods, systems, and non-transitory computer readable mediums storing instructions for creating and executing migration workflows to replicate or migrate data (collectively referred to herein as 'migration') from one device or set of devices to another device or set of devices (e.g., from one computing environment to another). In one or more embodiments, the migrations are performed using network slices. The applications as well as their parts are prioritized and assigned to slices based on their priorities and/or relationships to other applications.

In one or more embodiments, the applications and/or their parts are placed in appropriate network slice queues based on their properties. Their properties can include application downtime, size of data needed for the application, as well as the applications relationship with one or more other applications. Based on predetermined rules, the application or parts of the applications can be assigned to high priority queues, normal priority, and/or low priority queues. Based on these queues a network slicing controller can then migrate the slices (applications) based on the particular queues the slices are assigned to and other parameters and rules.

In one or more embodiments, relationship information for the applications being migrated is obtained. The applications are classified based on their relationships such as HAS-A (two or more applications have a correlated relationship with each other) and IS-A (two or more applications have a dependency relationship, such as being parent and/or a child application.) Based on these classifications, one or more embodiments of the invention generate a relationship matrix in order to assign priority to the migration of each individual application.

FIG. 1A shows a diagram of a system in accordance with one or more embodiments described herein. The system may include any number of source devices (100), and any number of target devices (104). The system may also include a migrator (102) operatively connected to the source devices (100) and to the target devices (104). Each of these components is described below.

In one or more embodiments, the source devices (100) and the target devices (104) may be computing devices. Such computing devices may be referred to as endpoints. In one or more embodiments, an endpoint is any computing device, collection of computing devices, portion of one or more computing devices, or any other logical grouping of computing resources. In one or more embodiments, the source devices (100) may collectively be referred to as a source environment. Similarly, in one or more embodiments, target devices (104) may collectively be referred to as a target environment. In one or more embodiments, a computing device is any device, portion of a device, or any set of devices capable of electronically processing instructions and may include, but is not limited to, any of the following: one or more processors (e.g. components that include integrated circuitry) (not shown), memory (e.g., random access memory (RAM)) (not shown), input and output device(s) (not shown), non-volatile storage hardware (e.g., solid-state drives (SSDs), hard disk drives (HDDs) (not shown)), one or more physical interfaces (e.g., network ports, storage ports) (not shown), any number of other hardware components (not shown) and/or any combination thereof.

Examples of computing devices include, but are not limited to, a server (e.g., a blade-server in a blade-server chassis, a rack server in a rack, etc.), a desktop computer, a mobile device (e.g., laptop computer, smart phone, personal digital assistant, tablet computer and/or any other mobile computing device), a storage device (e.g., a disk drive array, a fiber channel storage device, an Internet Small Computer Systems Interface (iSCSI) storage device, a tape storage device, a flash storage array, a network attached storage device, etc.), a network device (e.g., switch, router, multi-layer switch, etc.), a virtual machine, a virtualized computing environment, a logical container (e.g., for one or more applications), and/or any other type of computing device with the aforementioned requirements. In one or more embodiments, any or all of the aforementioned examples may be combined to create a system of such devices, which may collectively be referred to as a computing device. Other types of computing devices may be used without departing from the scope of the invention. In one or more embodiments, a set of computing devices (100) may form all or a portion of a data domain, all, or part of which may require being migrated (e.g., re-located, backed-up, etc.) from time to time (e.g., upon request and/or pursuant to a defined schedule). In one or more embodiments, a data domain is any set of computing devices (100) for which migration services are performed, such as, for example, data backup, disaster recovery, backup data deduplication, re-location to updated/newer computing devices, etc.

In one or more embodiments, the non-volatile storage (not shown) and/or memory (not shown) of a computing device or system of computing devices may be one or more data repositories for storing any number of data structures storing any amount of data (i.e., information). In one or more embodiments, a data repository is any type of storage unit and/or device (e.g., a file system, database, collection of tables, RAM, and/or any other storage mechanism or medium) for storing data. Further, the data repository may include multiple different storage units and/or devices. The multiple different storage units and/or devices may or may not be of the same type or located at the same physical location.

In one or more embodiments, any non-volatile storage (not shown) and/or memory (not shown) of a computing device or system of computing devices may be considered, in whole or in part, as non-transitory computer readable mediums storing software and/or firmware.

Such software and/or firmware may include instructions which, when executed by the one or more processors (not shown) or other hardware (e.g., circuitry) of a computing device and/or system of computing devices, cause the one or more processors and/or other hardware components to perform operations in accordance with one or more embodiments described herein.

The software instructions may be in the form of computer readable program code to perform methods of embodiments as described herein, and may, as an example, be stored, in whole or in part, temporarily or permanently, on a non-transitory computer readable medium such as a compact disc (CD), digital versatile disc (DVD), storage device, diskette, tape storage, flash storage, physical memory, or any other non-transitory computer readable medium.

In one or more embodiments, the system also includes a migrator (102). In one or more embodiments, the migrator (102) is operatively connected to both the source devices (100) and the target devices (104). A migrator (102) may be located within a source environment, within a target environment, or separate from and connected to both environments. In one or more embodiments, the migrator (102) is a computing device. In one or more embodiments, a computing device (100) is any device, portion of a device, or any set of devices capable of electronically processing instructions and may include, but is not limited to, any of the following: one or more processors (e.g. components that include integrated circuitry) (not shown), memory (e.g., random access memory (RAM)) (not shown), input and output device(s) (not shown), non-volatile storage hardware (e.g., SSDs, HDDs (not shown)), one or more physical interfaces (e.g., network ports, storage ports) (not shown), any number of other hardware components (not shown) and/or any combination thereof.

Examples of computing devices include, but are not limited to, a server (e.g., a blade-server in a blade-server chassis, a rack server in a rack, etc.), a desktop computer, a mobile device (e.g., laptop computer, smart phone, personal digital assistant, tablet computer and/or any other mobile computing device), a storage device (e.g., a disk drive array, a fiber channel storage device, an iSCSI storage device, a tape storage device, a flash storage array, a network attached storage device, etc.), a network device (e.g., switch, router, multi-layer switch, etc.), a virtual machine, a virtualized computing environment, a logical container (e.g., for one or more applications), and/or any other type of computing device with the aforementioned requirements. In one or more embodiments, any or all of the aforementioned examples may be combined to create a system of such devices, which may collectively be referred to as a computing device. Other types of computing devices may be used without departing from the scope of the invention.

In one or more embodiments, the non-volatile storage (not shown) and/or memory (not shown) of a computing device or system of computing devices may be one or more data repositories for storing any number of data structures storing any amount of data (i.e., information). In one or more embodiments, a data repository is any type of storage unit and/or device (e.g., a file system, database, collection of tables, RAM, and/or any other storage mechanism or medium) for storing data. Further, the data repository may include multiple different storage units and/or devices. The multiple different storage units and/or devices may or may not be of the same type or located at the same physical location.

In one or more embodiments, a computing device includes and/or is operatively connected to any number of storage volumes (not shown). In one or more embodiments, a volume is a logically accessible storage element of a computing system. A volume may be part of one or more disk drives, and may include, or not, any number of partitions. In one or more embodiments, a volume stores information relevant to the operation and/or accessible data of a computing device. In one or more embodiments, a volume may be all or part of any type of computing device storage (described above).

In one or more embodiments, any non-volatile storage (not shown) and/or memory (not shown) of a computing device or system of computing devices may be considered, in whole or in part, as non-transitory computer readable mediums storing software and/or firmware.

Such software and/or firmware may include instructions which, when executed by the one or more processors (not shown) or other hardware (e.g., circuitry) of a computing device and/or system of computing devices, cause the one or more processors and/or other hardware components to perform operations in accordance with one or more embodiments described herein.

The software instructions may be in the form of computer readable program code to perform methods of embodiments as described herein, and may, as an example, be stored, in whole or in part, temporarily or permanently, on a non-transitory computer readable medium such as a compact disc (CD), digital versatile disc (DVD), storage device, diskette, tape storage, flash storage, physical memory, or any other non-transitory computer readable medium.

Figure 1B:
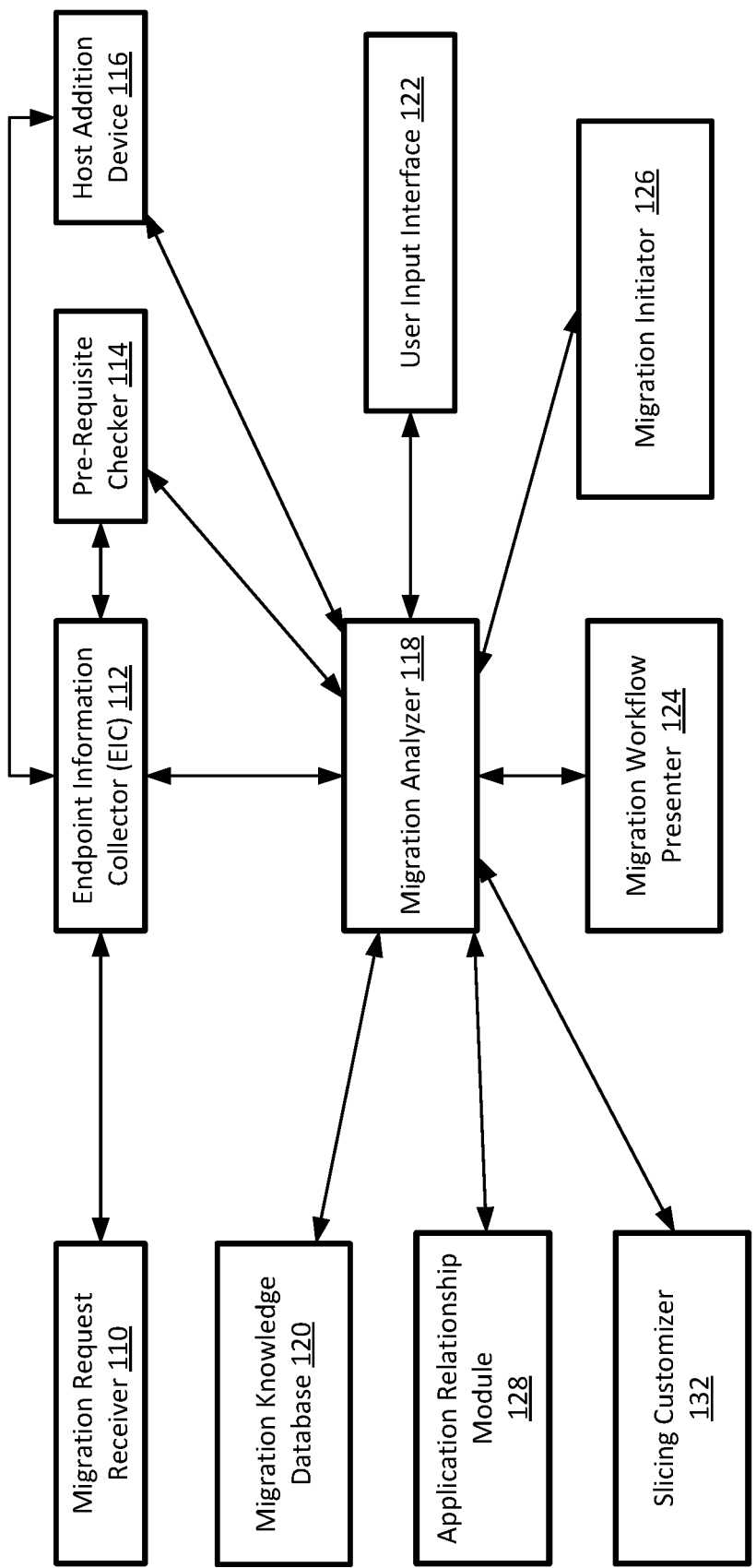
FIG. 1B shows a diagram of a migrator in accordance with one or more embodiments of the invention.
Figure 1C:
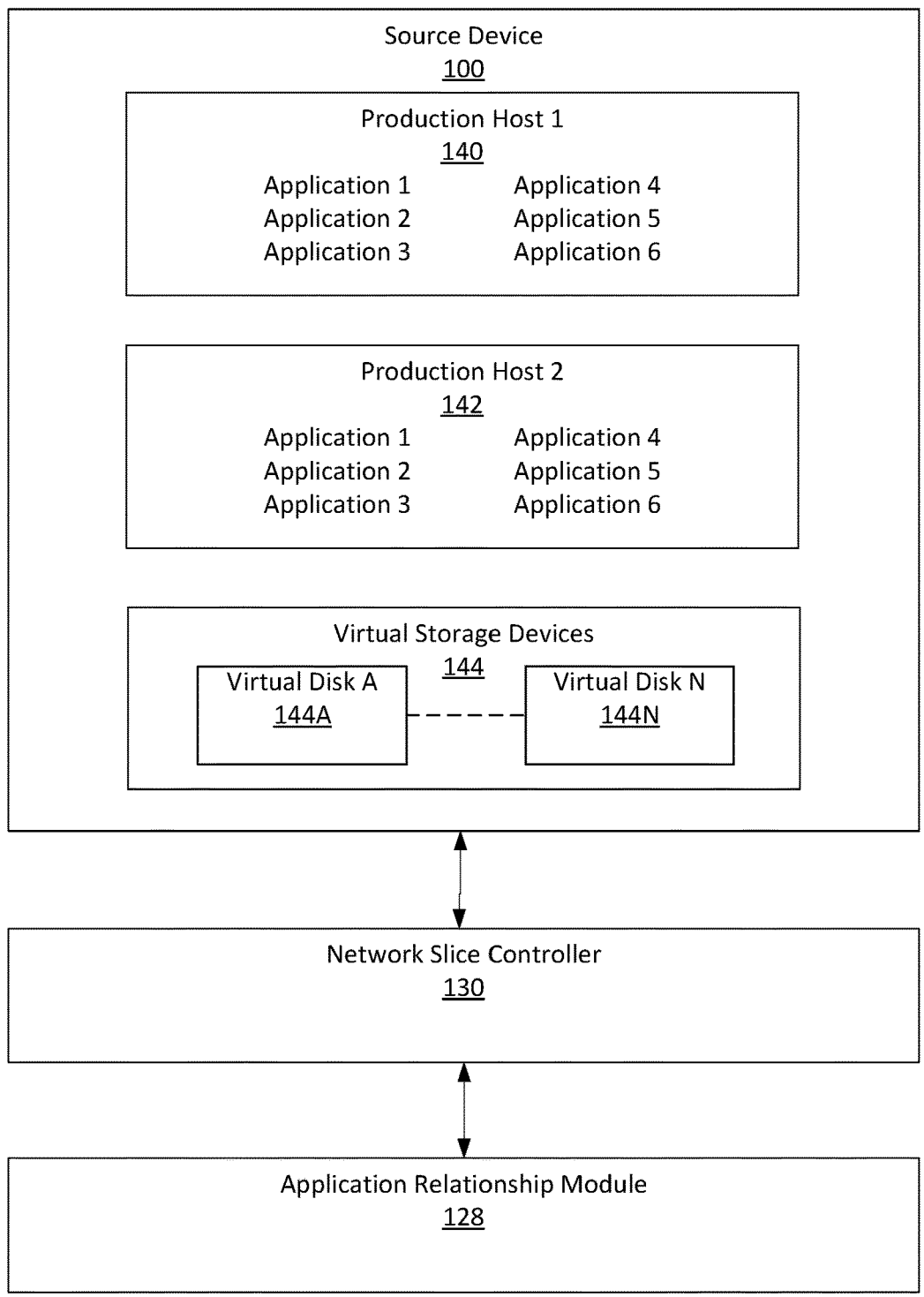
FIG. 1C shows a diagram of a system that performs the claimed methods in one or more embodiments of the invention
Figure 1D:
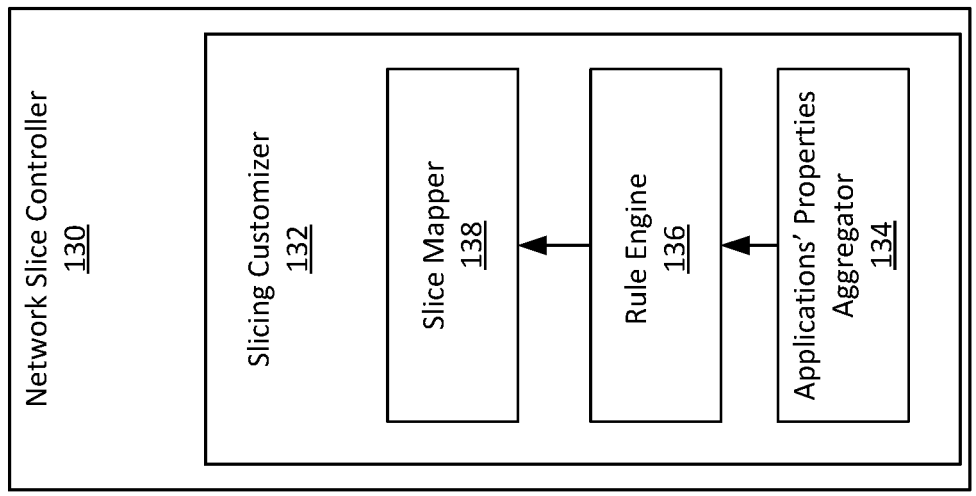
FIG. 1D shows a diagram of a network slice controller in accordance with one or more embodiments of the invention.

The migrator (102), and components, therein are discussed further in relation to FIGS. 1B-1D.

In one or more embodiments, the source devices (100), the migrator (102), and/or the target devices (104) are operatively connected via a network (not shown). A network may refer to an entire network or any portion thereof (e.g., a logical portion of the devices within a topology of devices). A network may include a datacenter network, a wide area network, a local area network, a wireless network, a cellular phone network, or any other suitable network that facilitates the exchange of information from one part of the network to another. A network may be located at a single physical location or be distributed at any number of physical sites. In one or more embodiments, a network may be coupled with or overlap, at least in part, with the Internet.

While FIG. 1A shows a configuration of components, other configurations may be used without departing from the scope of embodiments described herein. Accordingly, embodiments disclosed herein should not be limited to the configuration of components shown in FIG. 1A.

FIG. 1B shows a diagram of a migrator (102) in accordance with one or more embodiments described herein. The migrator (102) may include any number of components. As shown in FIG. 1B, the migrator (102) includes a migration request receiver (110), an endpoint information collector (EIC) (112), a pre-requisite checker (114), a host addition device (116), a migration analyzer (118), a migration knowledge database (120), a user input interface (122), a migration workflow presenter (124), a migration initiator (126), an application relationship module (128), and a slicing customizer (132). Each of these components is described below.

In one or more embodiments, a migrator (102) is a computing device, as discussed above in the description of FIG. 1A.

In one or more embodiments, the migrator (102) includes a migration request receiver (110). In one or more embodiments, a migration request receiver (110) is any hardware (e.g., circuitry), software, firmware, or any combination thereof that includes functionality to receive a request that all or any portion of a source environment (e.g., source devices (100) of FIG. 1A) be migrated to a target environment (e.g., target devices (104) of FIG. 1A). In one or more embodiments, such a migration request may be received via a user interface (not shown), may be received on a recurring basis as part of a planned migration scheme, may be received as part of a planned computing environment upgrade, etc. A migration request may be for any type of migration or combination of migration types. Examples of migration types include, but are not limited to: storage array to hyper-converged infrastructure (HCI); host server to host server, VM environment to HCI, storage array to storage array, hypervisors to hypervisors, host servers to storage array, on-premise computing devices to a cloud environment and vice versa, application servers to application servers (e.g., older Exchange server to either a newer on-premise Exchange server or to a cloud-based Exchange service.), different source to target endpoints that may be from vendors that are unique and different, backup of all or part of a data center environment, etc. One of ordinary skill in the art, having the benefit of this detailed disclosure will appreciate that any other type of migration may be requested without departing from the scope of embodiments described herein.

In one or more embodiments, the migrator (102) includes an endpoint information collector (EIC) (112) operatively connected to the migration request receiver (110). In one or more embodiments, an EIC (112) is any hardware (e.g., circuitry), software, firmware, or any combination thereof that includes functionality to obtain endpoint information from source devices and target devices. In one or more embodiments, endpoint information is obtained in any manner capable of collecting data from or about computing devices.

Such endpoint information may include, but is not limited to: system types, license information, software versions, virtualization environment details, operating system information, virtual machine information, source and target device identification information, endpoint organization information (e.g., cluster membership), HCI details information, storage configuration information, storage array details (e.g., RAID level configuration information), disk information (e.g., disk type, disk layout, etc.), network configuration information, interface connection information, network speed information, network adapter information, network addresses, feature enablement information, endpoint system setting information (e.g., BIOS information), file system information, storage management initiative specification (SMIS) object information, protocol information, device type information, cache policy information, spare storage information, storage controller information, storage area network information, operating system information, file system information, application information and settings, process identifiers, common object model (COM) object information, etc. One having ordinary skill in the art will appreciate that any other type of information that could be associated with all or any portion of computing devices or with any portion thereof in a computing environment may be considered endpoint information without departing from the scope of embodiments described herein.

In one or more embodiments, the migrator (102) includes a pre-requisite checker (114) operatively connected to the EIC (112). In one or more embodiments, a pre-requisite checker (114) is any hardware (e.g., circuitry), software, firmware, or any combination thereof that includes functionality to obtain endpoint information from the EIC (112) and use the information to perform one or more pre-requisite checks.

In one or more embodiments, a pre-requisite check is an analysis of a target environment for a migration, relative to the source environment, to identify whether any inconsistencies may exist that would cause a requested migration to fail. For example, the pre-requisite checker (114) may determine if any storage characteristics, network configuration, computing device processor settings, etc. are different in the target environment relative to the source environment. In one or more embodiments, the pre-requisite checker includes functionality to assess each difference discovered during the pre-requisite check (which may be captured in pre-requisite check logs), and to take actions to mitigate the differences discovered. Such actions may be taken, for example, by using any application programming interface, command line interface, etc. that is capable of adjusting the configuration of target devices in the target environment.

In one or more embodiments, the migrator (102) includes a host addition device (116) operatively connected to the EIC (112). In one or more embodiments, a host addition device (116) is any hardware (e.g., circuitry), software, firmware, or any combination thereof that includes functionality to obtain endpoint information from the EIC (112) in response to a request to add a new endpoint (e.g., host server) to a source environment that is being migrated as part of a migration workflow, and to generate a new migration job for the new host and add it to a migration workflow. In one or more embodiments, when a new host is added to a source environment that is being migrated by a migration workflow, the host may be added to the migration workflow instead of having to wait until the migration workflow has been completed. In one or more embodiments, when a request to add a new host is received, the host addition device (116) invokes a job priority analyzer (not shown) to determine what action to take.

In one or more embodiments, the job priority analyzer determines the priority assigned to the migration jobs of the currently executing migration workflow, which may be assigned by the job priority analyzer at that time, and/or which may have been assigned to the migration jobs prior to the new host addition. In one or more embodiments, the priority assigned to migration jobs of a migration workflow determines the order that the jobs are placed within a queue that determines the order of execution of the migration jobs.

In one or more embodiments, during execution of a migration workflow, migration jobs for specific applications or devices may be assigned a priority. As such, a migration workflow may be organized such that higher priority migration jobs occur before lower priority migration jobs. For example, a set of storage volumes that are part of a consistency group and have never been backed up may be assigned a high priority; a set of storage volumes that have been backed up a small number of times may be assigned a medium priority; and a set of storage volumes that have been backed up many times and are scheduled to be backed up on a frequent basis may be assigned a low priority.

In one or more embodiments, the job priority analyzer of the host addition device (116) determines the priority assigned to a currently executing migration job. In one or more embodiments, if the priority is higher than a priority threshold, then the new host addition request is not serviced until the current migration job is completed. For example, if the threshold is above low priority, then any medium or high priority job will be completed. In one or more embodiments, if the priority of the currently executing migration job is below the threshold, then the migration job is paused. For example, if the threshold is above a low priority, then a migration job assigned a low priority is paused.

In one or more embodiments, after completion of a migration job above a priority threshold, or after pausing a migration job below a priority threshold, the host addition device (116) services the new host addition request. In one or more embodiments, servicing the new host addition request includes using the EIC (112) to gather endpoint information about the new host, to create one or more new consistency group(s) for the new host, to create a new migration job, and to assign a priority to the new migration job. In one or more embodiments, the host addition device (116) includes functionality to place the new migration job into the queue of remaining migration jobs of a migration workflow based on the assigned priority. As such, in one or more embodiments, the new migration job is integrated into the existing and currently executing migration workflow before the migration workflow completes.

In one or more embodiments, each of the EIC (112), the pre-requisite checker (114), and the host addition device (116) of the migrator (102) are operatively connected to a migration analyzer (118). In one or more embodiments, a migration analyzer (118) is any hardware (e.g., circuitry), software, firmware, or any combination thereof that includes functionality to obtain endpoint information from the EIC (112) and to analyze the information to develop a migration workflow that includes any number of mini-workflows to perform a migration of source endpoints to target endpoints as part of a requested migration. In one or more embodiments, the migration analyzer includes functionality to classify and filter endpoint information and apply artificial intelligence via machine learning techniques (e.g., multi-label correlation algorithms) to the endpoint information to associate portions of the endpoint information with mini-workflow templates available in a migration knowledge database (discussed below) as part of building a migration workflow.

In one or more embodiments, the migration analyzer (118) is operatively connected to a migration knowledge database (120). In one or more embodiments, a migration knowledge database (120) is a data storage of any type that includes functionality to store migration workflows as sets of discrete mini-workflows that may be labeled based on the characteristics of endpoint information that may be migrated using the mini-workflow. In one or more embodiments, the migration knowledge database (120) includes a starting set of known mini-workflows for migrating a variety of standard endpoint types, as well as all, or any, portion of previously executed workflow templates, which are stored in the migration knowledge database as migration workflows are executed, thereby expanding the migration knowledge database to encompass migrations of new endpoints as they are encountered. As such, future migrations may become more efficient as the database grows to have more mini-workflow templates that encompass an increasingly large set of possible-endpoint migration scenarios.

In one or more embodiments, when a similar migration request is received, the stored workflow templates will be reused instead of creating an entirely new workflow. In one or more embodiments, the mini-workflows of the migration knowledge database (120) may be combined and/or re-combined in any way to form part of a new migration workflow, rather than only being used for the same type of overall migration workflow, for which the mini-workflow was originally used. For example, a new migration request may cause the migration analyzer to create a new migration workflow that uses certain mini-workflows from one previously executed migration workflow, and other mini-workflows from other previously executed migration workflows, to build a new migration workflow for the new request using the existing mini-workflows, instead of having to re-create each mini-workflow and/or an overall migration workflow.

In one or more embodiments, the migration analyzer (118) is also operatively connected to a user input interface (122). In one or more embodiments, a user input interface (122) is any hardware (e.g., circuitry), software, firmware, or any combination thereof that includes functionality to receive or otherwise obtain any user input required to generate a complete migration workflow. In one or more embodiments, if a migration analyzer identifies a certain mini-workflow that meets a minimum threshold as acceptable to use as part of a migration workflow to migrate a portion of the endpoint information of source endpoints, additional user input may still be required to add to the mini-workflow as additional information to facilitate the migration. In one or more embodiments, such additional information may be used to augment the selected mini-workflow, and such an augmented mini-workflow may be added as a new mini-workflow to the migration knowledge database (120) to be used in future migration workflow building, which may reduce the need for at least some future user input during the building of a migration workflow in response to a migration request. In one or more embodiments, user input may be received via the user input interface (122) via any method of receiving information. For example, a user may be presented with a graphical or command line interface that prompts a user to enter requested information.

In one or more embodiments, the migration analyzer (118) is operatively connected to a migration workflow presenter (124). In one or more embodiments, a migration workflow presenter (124) is any hardware (e.g., circuitry), software, firmware, or any combination thereof that includes functionality to present a migration workflow for approval to any one or more approving entities (not shown). In one or more embodiments, once a migration workflow has been developed for a requested migration, the entire migration workflow may be presented to any number of entities that are responsible for the migration. For example, stakeholders such as data center administrators, network administrators, system administrators, decision makers for an entity in control of a data center, etc. may each have to approve a migration workflow before a migration may take place. Accordingly, a migration workflow presenter (124) may include functionality to present the proposed migration workflow to such entities.

In one or more embodiments, the migration workflow presenter (124) is operatively connected to a migration initiator (126). In one or more embodiments, a migration initiator (126) is any hardware (e.g., circuitry), software, firmware, or any combination thereof that includes functionality to initiate a migration once the migration has been approved after presentation by a migration workflow presenter (124). In one or more embodiments, initiating a migration includes beginning execution of migration workflow jobs of a migration workflow in an order determined by a queue of migration jobs that is created based on the relative priority of the migration jobs. In one or more embodiments, a new host addition via a new host addition device (116) may pause a migration workflow to add a new migration job for a new consistency group for the new host as discussed above.

In one or more embodiments of the invention, the migrator (102) includes an application relationship module (128). The application relationship module (128) determines the relationship between individual applications that are to be migrated. Based on this determination the migration analyzer (118) can then determine a priority for each application.

In one or more embodiments, the job priority analyzer determines the priority assigned to the applications based on the relationship matrix developed by the application relationship module (128). In one or more embodiments, the priority assigned to migration jobs of individual applications determines the order that the jobs are placed within a queue that determines the order of execution of the migration jobs. The method of assigning the priority and determining the order of execution will be discussed in more detail with regards to FIGS. 2 and 3 below. In one or more embodiments, a migration job requires that a parent application must be migrated and re-started successfully before a child application is migrated. In still other one or more embodiments of the invention the job priority analyzer assigns applications with a HAS-A relationship a higher priority than those associated with an IS-A relationship In one or more embodiments of the invention the application relationship module (128) determines the relationships between an application to be migrated and other applications. The relationship in one or more embodiments of the invention, can be determined by port mapping such as looking at port mapping meta-data or the actual system internal traffic on various ports. By analyzing whether traffic on a specific port is outgoing or incoming, the relationship mapper or other equivalent structure can determine when the application is the parent node, and which is the child node. The independent application in a system would be a parent and the dependent application would be the child. The child or dependent application would be considered to have an IS-A relationship with the parent.

In one or more embodiments of the invention, the application relationship module, finds multiple applications with the same system access to the same data paths and location. In this case the application relationship module, determines that the two applications have a HAS-A relationship. This can be determined by the application relationship module, by looking at meta-data for the particular data path and or a registration ID that is common to at least two applications. Other means for identifying both a HAS-A relationship and/or IS-A relationship can be used, without departing from the invention.

In one or more embodiments of the invention, the migrator (102) includes a slicing customizer (132). The slicing customizer (132) analyzes the applications and their data, to determine one or more network slicing queues to assign the application and/or its data to. In accordance with one or more embodiments of the invention, based on these slicing queues, the applications and their data can be migrated utilizing network slices. The slicing customer (132) may be a component of a network slice controller (not shown) (130) (see FIG. 1D). The network slice controller may be located within the migrator (102).

While FIG. 1B shows a configuration of components, other configurations may be used without departing from the scope of embodiments described herein. For example, although FIG. 1B shows all components as part of the same device, any of the components may be grouped in sets of one or more components which may exist and execute as part of any number of separate and operatively connected devices. Accordingly, embodiments disclosed herein should not be limited to the configuration of components shown in FIG. 1B.

FIG. 1C shows a diagram of a system that performs the claimed methods in one or more embodiments of the invention. The system includes source device (100) an application relationship module (128) and network slice controller (130) in accordance with one or more embodiments described herein. For simplicity, the system shown in FIG. 1C only shows a subset of the system (e.g., the systems shown in FIGS. 1A and 1B).

As shown in FIG. 1C, the source device (100) includes a one or more hosts (also referred to as production hosts) (e.g., 140, 142) as well as a plurality of virtual storage devices (e.g., 144A, 144N). In one or more embodiments of the invention the target device (e.g., 104, FIG. 1A) has a similar form and structure to that of the source device (100). In one or more embodiments of the invention, the target device (e.g., 104, FIG. 1A) and source device (e.g., 100) may be part of the same physical device. In other embodiments, they may be separate devices that are connected, typically via a network, by either a wired and/or wireless connection. One or more of the devices may also be an Internet or cloud based virtual device. Other configurations of the source device (100) and target device (104) can be used without departing from the invention.

In one or more embodiments of the invention, the production hosts (e.g., 140, 142), host one or more applications. In one or more embodiments of the invention, the application(s) perform computer implemented services for clients (not shown). Performing the computer implemented services may include performing operations on asset data that is stored in the virtual storage devices (e.g., 144). The operations may include creating elements of assets, moving elements of assets, modifying elements of assets, deleting elements of assets, and other and/or additional operations on asset data without departing from the invention. The application(s) may include functionality for performing the aforementioned operations on the asset data in the production hosts (e.g., 140, 142). The application(s) may be, for example, instances of databases, email servers, and/or other applications. The production hosts (e.g., 140, 142) may host other types of applications without departing from the invention, including hosting the application relationship module (128).

In one or more of embodiments of the invention, the applications are implemented as computer instructions, e.g., computer code, stored on a persistent storage or virtual storage devices (144), that when executed by a processor(s) of the production hosts (e.g., 140, 142) cause the production hosts (e.g., 140, 142) to provide the functionality of the application(s) described throughout this application.

The production hosts (e.g., 140, 142) may include physical storage or logical storage (144, as shown in FIG. 1C). One or more of the production hosts (e.g., 140, 142), may be externally located on a cloud or other external location. The logical storage devices (144) may utilize any quantity of hardware storage resources of any number of computing devices for storing data. For example, the persistent storage may utilize portions of any combination of hard disk drives, solid state disk drives, tape drives, and/or any other physical storage medium of any number of computing devices.

In one or more embodiments of the invention, the production hosts (e.g., 140, 142) may host virtual machines that host the above-discussed applications. Each of the production hosts (e.g., 140, 142) may host any number of VMs that, in turn, host any number of applications. Each of the production hosts (e.g., 140, 142) may host or be operatively connected to a plurality of virtual storage devices (e.g., 144A, 144N). Alternatively, in one or more embodiments of the invention the virtual storage devices (144) can instead be physical storage devices such as hard disk drive, solid disk drive, tape drives, and or other physical storage mediums of any number of computing devices.

Figure 4:
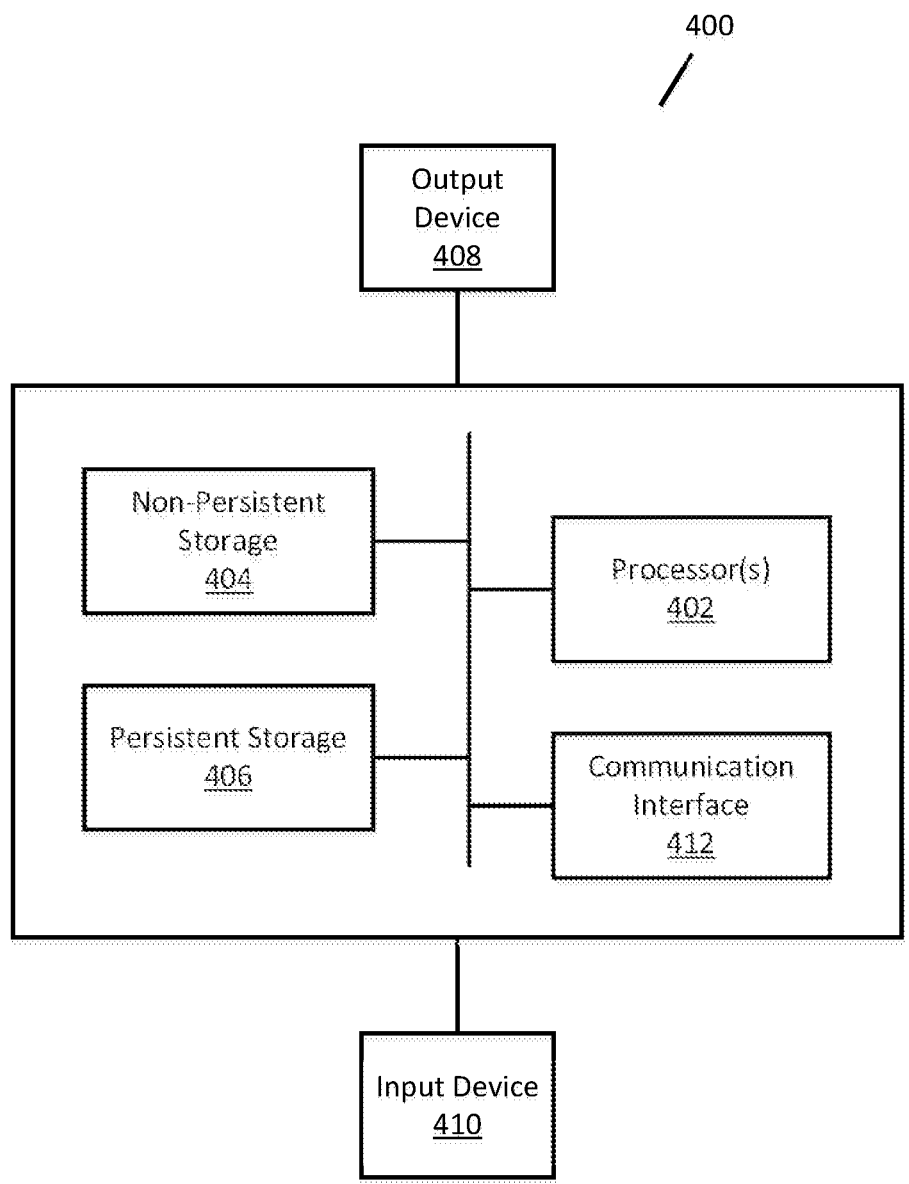
FIG. 4 shows a computing system in accordance with one or more embodiments of the invention.

In one or more embodiments of the invention, the production hosts (e.g., 140, 142) may be implemented as computing devices (e.g., 400, FIG. 4). A computing device may be, for example, a mobile phone, a tablet computer, a laptop computer, a desktop computer, a server, a distributed computing system, or a cloud resource. The computing device may include one or more processors, memory (e.g., random access memory), and persistent storage (e.g., disk drives, solid-state drives, etc.). The computing device may include instructions, stored on the persistent storage, that when executed by the processor(s) of the computing device, cause the computing device to perform the functionality of the production hosts (e.g., 140, 142) described throughout this application.

In one or more embodiments of the invention the system as shown in FIG. 1C, includes an application relationship module (128) for determining the relationship of the various applications on one or more hosts (e.g., 140, 142) that are to be migrated in accordance with the method of the invention which will be described in more detail with regards to FIGS. 2 and 3.

The application relationship module (128), while shown in FIG. 1B as part of the migrator, can be a separate device from the migrator.

As discussed above, the application relationship module (128) monitors and controls communications between various devices making up the source (100) and/or target device (104). The communications can take the form of, but not limited to, shared memory segments, pipes, message queues, semaphore arrays, and sockets. The application relationship module (128) also correlates the dependencies between application and stores these dependencies in a data store (not shown). The application relationship module (128) can determine the relationship of each application that is to be migrated as discussed above with regards to FIG. 1A, and in more detail below with regards to the methods of FIGS. 2 and 3.

In one or more embodiments of the invention, the application relationship module (128) may be implemented as computing devices (e.g., 400, FIG. 4). A computing device may be, for example, a mobile phone, a tablet computer, a laptop computer, a desktop computer, a server, a distributed computing system, or a cloud resource. The computing device may include one or more processors, memory (e.g., random access memory), and persistent storage (e.g., disk drives, solid-state drives, etc.). The computing device may include instructions, stored on the persistent storage, that when executed by the processor(s) of the computing device, cause the computing device to perform the functionality of the application relationship module (128) described throughout this application.

In one or more embodiments of the invention, the system as shown in FIG. 1C includes a network slice controller (130), which as will be described in more detail with regards to FIG. 1D, can include a slicing customizer (132). As described in more details with regards to regards to FIG. 1D and the method of FIG. 2, the network slice controller (130) migrates the applications and their data utilizing network slices.

As discussed above, the network slice controller (130) may be part of the migrator. However, in another embodiment of the invention, the network slice controller (130) may be implemented as a computing device (e.g., 400, FIG. 4) that is separate from the migrator (102). A computing device may be, for example, a mobile phone, a tablet computer, a laptop computer, a desktop computer, a server, a distributed computing system, or a cloud resource. The computing device may include one or more processors, memory (e.g., random access memory), and persistent storage (e.g., disk drives, solid-state drives, etc.). The computing device may include instructions, stored on the persistent storage, that when executed by the processor(s) of the computing device, cause the computing device to perform the functionality of the network slice controller (130) described throughout this application.

While FIG. 1C shows a configuration of components, other configurations may be used without departing from the scope of embodiments described herein. For example, although FIG. 1C shows all components as part of two devices, any of the components may be grouped in sets of one or more components which may exist and execute as part of any number of separate and operatively connected devices. Accordingly, embodiments disclosed herein should not be limited to the configuration of components shown in FIG. 1C.

FIG. 1D shows a diagram of a network slice controller (130) in one or more embodiments of the invention.

As shown in FIG. 1D, the network slice controller (130) includes slicing customizer (132). Alternatively, the slicing customizer (132) can be part of a migrator (e.g., 102, FIG. 1A) or a separate component. The network slice controller (130) is shown only including a slicing customizer; however, other components such as rules engines and/or networking devices may be included. In one or more embodiments of the invention, the network slice controller (130) and migrator (e.g., 102, FIG. 1A) and/or the source device(s) (e.g., 100, FIG. 1A) or target device(s) (e.g., 104, FIG. 1A) may be part of the same physical device. In other embodiments, they may be separate devices that are connected either by a wired or wireless connection. One or more of the devices may also be an Internet or cloud based virtual device. Other configurations of the network slice controller (130) and/or slicing customizer (132) can be used without departing from the invention.

In one or more embodiments of the invention, the slicing customizer (132) comprises of multiple components. The components can include a slice mapper (138), a rules engine (136), and an applications' properties aggregator (134); more or less components and/or modules can be included in the slicing customizer (132) without departing from the invention. In one or more of embodiments of the invention, the components (e.g., 134-138) of the slicing customizer (132) are implemented as computer instructions, e.g., computer code, stored on a persistent storage or virtual storage devices. In one or more other embodiments of the invention, the components (e.g., 134-138) of the slicing customizer (132) may include physical devices and/or may be externally located on a cloud or other external location.

In one or more embodiments of the invention, the applications' properties aggregator (134) aggregates application information for the applications that are designated to be migrated. In one or more other embodiments of the invention the applications' properties aggregator (134) maintains a database (or other data structures) that include application properties for the all or a portion of the system (see e.g., FIG. 1A), which are aggregated (or combined) when an application is installed or implemented. In one or more embodiments of the invention the applications' properties aggregator (134) obtains such information as the size of the application, the size of the data needed or produced by the application, the type of application, the priority of the application, and other data that is determined to be useful for performing migrations of the applications, including relationships with other applications such as determined by an application relationship module (e.g., 128, FIG. 1C).

The applications' properties aggregator (134), in one or more embodiments of the invention, provides information/properties of one or more applications that are to be migrated to a rules engine (136). The rules engine applies predetermined rules based on the properties of the application to determine a migration priority for the application. The rules can be rules that are implemented by the manufacturer of the system and/or can be rules assigned by an administrator or user of the system. Other entities may provide rules for the rules engine without departing from the invention.

In one or more embodiments of the invention the rules comprise of a priority class. The priority class can be based on the application's tolerance for downtime, the size of the application and data needed to be migrated, and/or the applications relationship to other applications. In one or more embodiments of the invention, the applications are assigned to one of at least two classes. As a non-limiting example, where priority classes are based on the application's tolerance for downtime, the application can be assigned to one of three classes where class I is an application that cannot tolerate downtime, class II is an application that can tolerate some downtime (for example an hour or other unit of time determined by an administrator or user), class III is an application that can tolerate any amount of down time.

Based on the rules and the classes applied by the rules engine (136), the slice mapper (138) can then assign or map the application and/or its data to one or more network slice queues based on the application and/or its data's class, as determined by the rules engine (136). In one or more embodiments of the invention, the slice mapper (138) assigns or maps the applications and/or their data to two network slice queues: a high priority network slice queue and a low priority network slice queue. Additional network slice queues can be used without departing from the invention.

In one or more embodiments of the invention, each application is assigned to one network slice queue. In other one or more embodiments of the invention, each application and its data can be assigned to more than one queue, where part of the application and/or its data is of one class and another part of the application and/or its data is of a different class. In yet another embodiment of the invention, an application and/or its data can be assigned to the same network slice queue but migrated in multiple slices based on separate rules of the network slice controller (130).

Once the slicing customizer (132) finishes mapping/assigning the applications and/or their data to the appropriate network slice queues, the network slice controller (130) assigns the application and/or its data to the appropriate network slices based on the network slice controller's (130) rules and procedures, and the application's and/or their data's slice queue(s). The network slice controller (130) then transmits the network slices based on the network slice controller's (130), related systems', and network component's predetermined rules and procedures.

In one or more embodiments of the invention, network slicing may be a form of virtual network architecture that enables one or more logical networks to be executed on top of the network. To be able to execute the logical networks on top of the network, the network slicing may use, for example: a software defined networking (SDN) method, a network function virtualization (NFV) method, etc.

In one or more embodiments of the invention, each logical network, referred to as a "network slice", may encompass an end-to-end virtual network with dedicated storage and/or computing resources. In one or more embodiments, each network slice may, for example: implement a set of network functions, be configured to execute a different set of requirements and/or priorities, be associated with a particular Quality of Service (QoS) class, etc.

In one or more embodiments of the invention, the network may include, but is not limited to: a low priority network slice, a normal priority network slice, a high priority network slice, etc. For example, consider a scenario in which the network has the low priority network slice and the high priority network slice. In this scenario, the network may allocate the same amount of bandwidth (BW) to the high priority network slice and to the low priority network slice. If the network supports a 10 Gigabytes per second (GB/s) BW with 5 milliseconds (ms) latency QoS network capacity, the network slice controller (202) may allocate a 5 GB/s BW with 30 ms latency QoS network capacity to each of the network slices.

In one or more embodiments of the invention, a BW of a network slice may refer to a volume of data that can be transmitted over the network slice in a transmission window. The transmission window may be a period of time, with a definite start and end, within which a data transmission is set to be completed.

In one or more embodiments of the invention, to be able to transmit urgent data, the network slice controller (130) may allocate more network capacity to the high priority network slice than the low priority network slice. Using the example discussed above as a reference, the network slice controller (130) may allocate a 7 GB/s BW with 15 ms latency QoS network capacity to the high priority network slice and a 3 GB/s BW with 35 ms latency QoS network capacity to the low priority network slice.

As yet another example, consider a scenario in which the network has the low priority network slice, the normal priority network slice, and the high priority network slice. In this scenario, based on the example discussed above as a reference, the network slice controller (130) may allocate: (i) a 5 GB/s BW with 25 ms latency QoS network capacity to the high priority network slice, (ii) a 3 GB/s BW with 35 ms latency QoS network capacity to the normal priority network slice, and (iii) a 2 GB/s BW with 50 ms latency QoS network capacity to the low priority network slice.

While FIG. 1D shows a configuration of components, other configurations may be used without departing from the scope of embodiments described herein. For example, although FIG. 1D shows all components as part of a single device (e.g., network slice controller 130), any of the components may be grouped in sets of one or more components which may exist and execute as part of any number of separate and operatively connected devices. Accordingly, embodiments disclosed herein should not be limited to the configuration of components shown in FIG. 1D.

Figure 2:
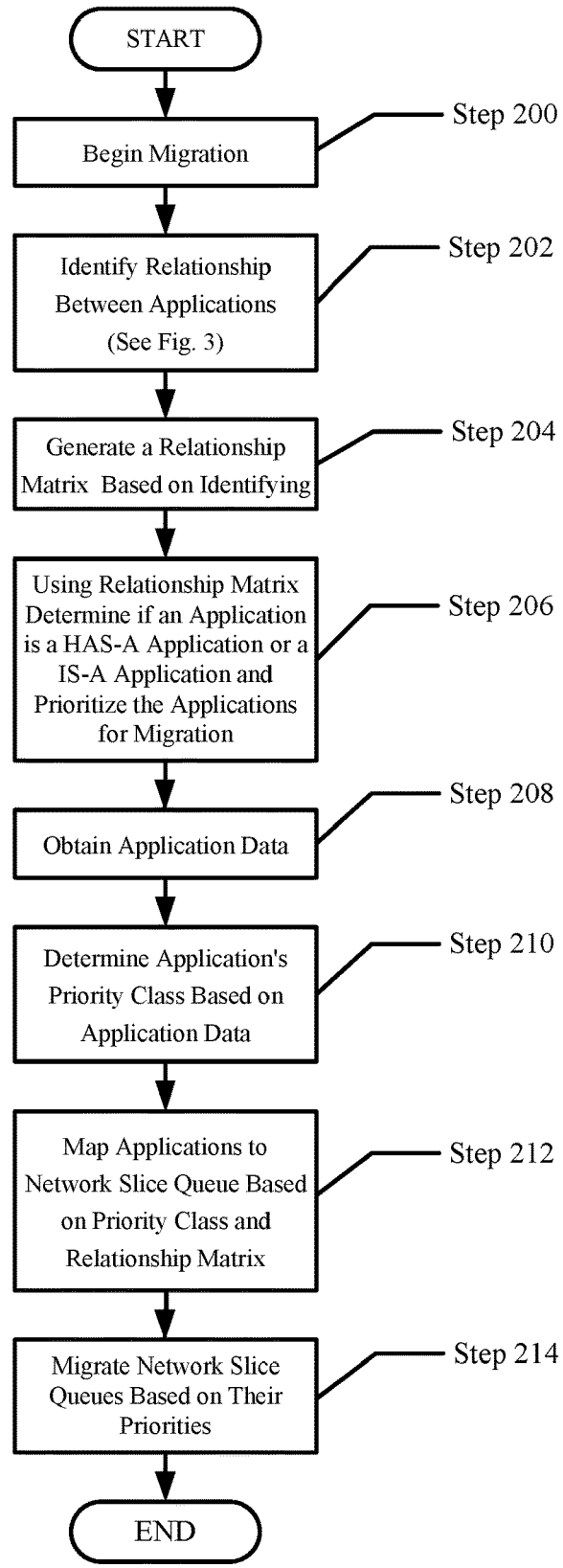
FIG. 2 shows a flowchart of a method for migrating applications in accordance with one or more embodiments of the invention.

FIG. 2 shows a flowchart describing a method for migrating one or more applications from a first device to a second device in accordance with one or more embodiments disclosed herein.

While the various steps in the flowchart shown in FIG. 2 are presented and described sequentially, one of ordinary skill in the relevant art, having the benefit of this Detailed Description, will appreciate that some or all of the steps may be executed in different orders, that some or all of the steps may be combined or omitted, and/or that some or all of the steps may be executed in parallel.

As discussed above, FIG. 2 shows a flowchart of a method for migrating one or more applications, in accordance with one or more embodiments of the invention. The method may be performed by, for example, the migrator (102, FIG. 1A) and/or any other part of either the source device (100, FIG. 1) or target device (104, FIG. 1). Other components of the system illustrated in FIGS. 1A-1D may perform all, or a portion of the method of FIG. 2 without departing from the invention.

While FIG. 2 is illustrated as a series of steps, any of the steps may be omitted, performed in a different order, additional steps may be included, and/or any or all the steps may be performed in a parallel and/or partially overlapping manner without departing from the invention.

In Step 200, a request is received to migrate any amount of a source device's applications and information to a target device or devices. In one or more embodiments, the migration request is received by a migrator.

In Step 202, the migrator identifies the relationship between the applications, as will be discussed in more detail below, with regards to the method of FIG. 3. The migrator identifies if at least two applications have a relationship and if the relationship is a HAS-A or IS-A relationship.

As discussed above, the application relationship module analyzing inter-process communications. The inter-process communication may include analyzing any one of shared memory segments, pipes, message queues, semaphore arrays and sockets. Other inter-process communications can be monitored as well. From this analysis and/or other processes, the specific port(s) that an application is running on are identified. The application relationship module can also identify shared pipes.

Based on the inter-process communications, ports, and shared pipes, the application relationship module can identify applications that are related to each other. Using the information gathered on the various communications, ports and pipes, the application relationship module can determine their relationship and identify if the relationship is an IS-A or HAS-A type relationship.

In Step 204, the migrator uses this identification of the relationships between the at least two applications to produce a matrix for each application showing its relationship to other applications. The matrix can take the form of a table as shown in the exemplary table below:

TABLE 1

| Application | Relationship | Applications |
| --- | --- | --- |
| DA1 | HAS-A | DA2, DA3, DA4 |
| DA2 | HAS-A | DA1 |
| DA3 | HAS-A | DA1 |
| DA4 | HAS-A; IS-A | DA1, DA5; DA1, DA6 |
| DA5 | HAS-A | DA4 |
| DA6 | Independent node | |
| DA7 | HAS-A; IS-A | DA8; DA4 |
| DA8 | HAS-A; IS-A | DA7; DA4 |
| DA9 | IS-A | DA5 |
| DA10 | IS-A | DA5 |
| DA11 | IS-A | DA9 |
| DA12 | IS-A | DA7; DA4 |
| DA13 | IS-A | DA6 |
| DA14 | HAS-A; IS-A | DA15; DA13 |
| DA15 | HAS-A | DA14 |

In Table 1, the relationships between fifteen different applications (DA1-DA15) are shown. The target application is listed in the first column. The type of relationship the target application has with other applications is listed in the second column (HAS-A: where two applications are working together, IS-A: where the child application is dependent on the parent application, and Independent: the application is independent of the other applications). The applications that the target application has the relationship listed in the second column with, is listed in the third column. More than one application can have the same type of relationship with the first application. The matrix produced in step 204 can take other forms such as database and in one or more embodiments of the invention, it can also be represented in the form of a relationship tree.

Next in Step 206, using the matrix or table generated in Step 204, the method determines whether an application is a HAS-A application or IS-A application and uses this determination to prioritize the applications for migration. In one or more embodiments of the invention the HAS-A applications are assigned a higher priority than similar ranked IS-A applications. Other orders and priorities can be assigned to the applications based on their relationships and other criteria in accordance with one or more embodiments of the invention.

The method then proceeds to Step 208, where the method obtains application data. This can be performed by applications' properties aggregator (e.g., 134, FIG. 1D). As described in more detail above the application data can include such information as the size of the application, the size of the data needed or produced by the application, the type of application, the priority of the application, and other data that is determined to be useful for performing migrations of the applications, including relationships with other applications such as determined above in Step 206.

Once the application data is obtained in Step 208, the method proceeds to Step 210. In Step 210 the priority class of each application and/or portion of each application and its data is assigned based on the application data obtained in Step 208. As described in more detail above, this can be performed by rules engine (e.g., 136, FIG. 1D). The priority class can be based on the application's tolerance for downtime, the size of the application and data needed to be migrated, and/or the applications relationship to other applications. In one or more embodiments of the invention, the applications are assigned to one of at least two classes. As a non-limiting example, where priority classes are based on the application's tolerance for downtime, the application can be assigned to one of three classes where class I is an application that cannot tolerate downtime, class II is an application that can tolerate some downtime (for example an hour or other unit of time determined by an administrator or user), class III is an application that can tolerate any amount of down time.

The method then proceeds to Step 212, where the applications and/or their data are mapped to network slice queues based on the priority classes obtained in Step 210 as well as their relationships as determined by the relationship matrix from Step 206.

In one or more embodiments of the invention, method in Step 212 assigns or maps the applications and/or their data to two network slice queues: a high priority network slice queue and a low priority network slice queue. Additional network slice queues can be used without departing from the invention.

For example, certain may be assigned to queue based on their priority classes; if the assigned data is dependent on other data (as defined by the relationship matrix, then this other data may be assigned to the same queue as the data regardless of the priority class associated with the other data). In another example, a piece of data is selected and then all related data (per the relationship matrix) is identified. Once the data and all related data are identified, the corresponding priority classes for the data and all related data are determined and the data and all related data is placed in the network slice queue corresponding to the highest priority class of any of the data and all related data. In this manner, the data and all related data are transmitted via the same network slice.

Once the applications and/or their data are assigned to the network slice queues in Step 212, they are migrated in Step 214 based on the slice queues priority in accordance with the rules and procedures of a network slice controller (e.g., 130, FIG. 1D) or other component of the system that performs network slicing. Other criteria besides the slice queues priority can also be considered without departing from the invention. The migration in step 214 includes transferring the queue data via the network slices corresponding to the network slice queues.

Once Step 214 is complete the method may end.

Figure 3:
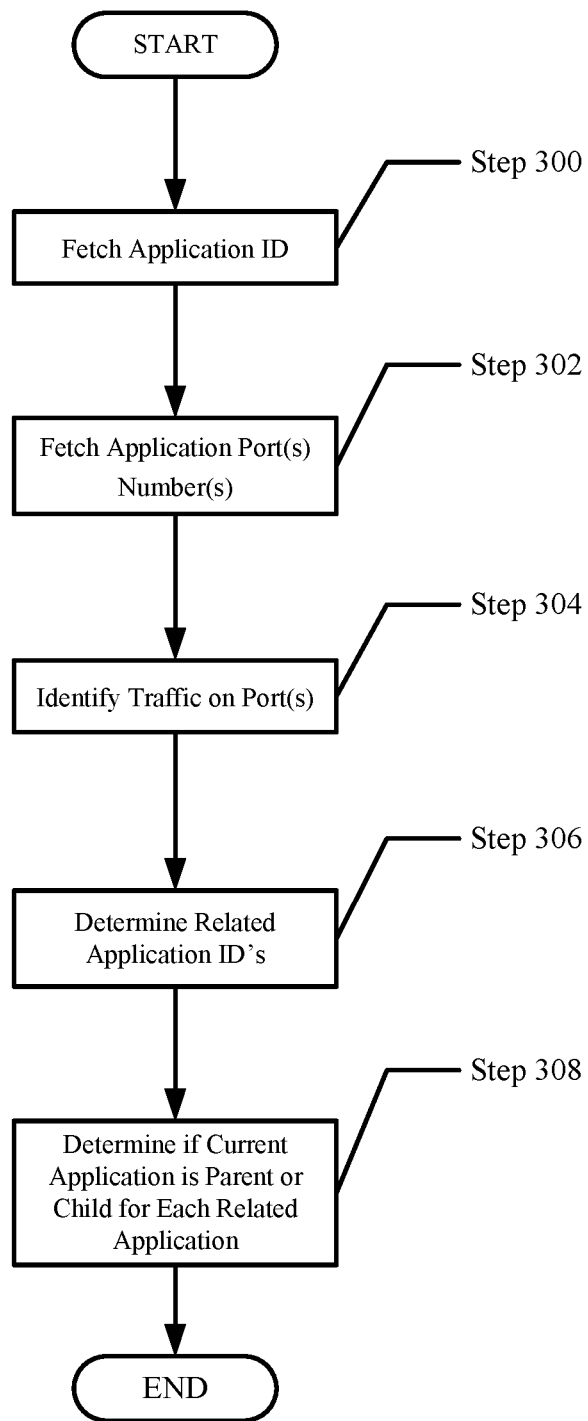
FIG. 3 shows a flowchart of a method to determine parent and child relationships for an application being migrated in accordance with one or more embodiments of the invention.

FIG. 3 shows a flowchart describing a method for determining the relationship between at least two applications in accordance with one or more embodiments disclosed herein.

While the various steps in the flowchart shown in FIG. 3 are presented and described sequentially, one of ordinary skill in the relevant art, having the benefit of this Detailed Description, will appreciate that some or all of the steps may be executed in different orders, that some or all of the steps may be combined or omitted, and/or that some or all of the steps may be executed in parallel.

As discussed above, FIG. 3 shows a flowchart of a method for determining the relationship between at least two applications, in accordance with one or more embodiments of the invention. This method may be performed on its own or as part of step 202 of the method of FIG. 2. The method may be performed by, for example, the application relationship module (e.g., 128, FIG. 1C) and/or any other part of either the source device (e.g., 100, FIG. 1) or target device (e.g., 104, FIG. 1). Other components of the system illustrated in FIGS. 1A-1D may perform all, or a portion of the method of FIG. 3 without departing from the invention.

While FIG. 3 is illustrated as a series of steps, any of the steps may be omitted, performed in a different order, additional steps may be included, and/or any or all the steps may be performed in a parallel and/or partially overlapping manner without departing from the invention.

In Step 300, for each application that is to be migrated, the method fetches the application identification (ID). This may be an ID given to an application by the migrator, a developer, or alternatively an ID that the system uses to identify the specific application.

Once the ID is obtained, then the method in Step 302 obtains the port number(s) used by the application. Step 302 can be performed by the application relationship module (e.g., 128, FIG. 1C), as described in more detail above. Other components of the migrator or the production hosts, alternatively, can perform Step 302 without departing from the invention. The method then identifies all the applications using a particular port(s) in step 304 and determines which applications are related in Step 306.

Based on the determination made in Step 306, and specifics of the communications between two applications, the migrator then in Step 308 determines if a current application is a parent or child for each related application. That information can then be used in Step 204 of the method of FIG. 2.

Once Step 308 is complete the method may end.

As discussed above, embodiments of the invention may be implemented using computing devices. FIG. 4 shows a diagram of a computing device in accordance with one or more embodiments of the invention. The computing device (400) may include one or more computer processors (402), non-persistent storage (404) (e.g., volatile memory, such as random access memory (RAM), cache memory), persistent storage (406) (e.g., a hard disk, an optical drive such as a compact disk (CD) drive or digital versatile disk (DVD) drive, a flash memory, etc.), a communication interface (412) (e.g., Bluetooth interface, infrared interface, network interface, optical interface, etc.), input devices (410), output devices (408), and numerous other elements (not shown) and functionalities. Each of these components is described below.

In one embodiment of the invention, the computer processor(s) (402) may be an integrated circuit for processing instructions. For example, the computer processor(s) may be one or more cores or micro-cores of a processor. The computing device (400) may also include one or more input devices (410), such as a touchscreen, keyboard, mouse, microphone, touchpad, electronic pen, or any other type of input device. Further, the communication interface (412) may include an integrated circuit for connecting the computing device (400) to a network (not shown) (e.g., a local area network (LAN), a wide area network (WAN) such as the Internet, mobile network, or any other type of network) and/or to another device, such as another computing device.

In one embodiment of the invention, the computing device (400) may include one or more output devices (408), such as a screen (e.g., a liquid crystal display (LCD), a plasma display, touchscreen, cathode ray tube (CRT) monitor, projector, or other display device), a printer, external storage, or any other output device. One or more of the output devices may be the same or different from the input device(s). The input and output device(s) may be locally or remotely connected to the computer processor(s) (402), non-persistent storage (404), and persistent storage (406). Many diverse types of computing devices exist, and the aforementioned input and output device(s) may take other forms.

In general, embodiments described above relate to methods, systems, and non-transitory computer readable mediums storing instructions for creating and executing migration workflows to replicate or migrate data from one device or set of devices to another device or set of devices (e.g., from one computing environment to another). In one or more embodiments, migrations involve obtaining relationship information with regards to the applications that will be migrated from one device to another device or set of devices. The migrations are performed with the use of network slice controller in such a way to ensure that the applications are migrated in accordance with their priority and in the quickest manner possible.

The problems discussed above should be understood as being examples of problems solved by embodiments of the invention and the invention should not be limited to solving the same/similar problems. The disclosed invention is broadly applicable to address a range of problems beyond those discussed herein.

While embodiments described herein have been described with respect to a limited number of embodiments, those skilled in the art, having the benefit of this Detailed Description, will appreciate that other embodiments can be devised which do not depart from the scope of embodiments as disclosed herein. Accordingly, the scope of embodiments described herein should be limited only by the attached claims.

What is claimed is:

1. A method for performing a migration, the method comprising:
receiving a request to migrate a plurality of applications from a source device to a target device at a migrator, the migrator connected to the source device and the target device;
identifying relationships between the plurality of applications, wherein identifying relationships comprises:
retrieving an application identification (ID) for each application of the plurality of applications in the request;
retrieving port numbers used for each application of the plurality of applications;
identifying all applications by application ID using each port based on the port numbers;
determining groups of related applications of the plurality of applications based on applications using each port, wherein an application is related to another application by analyzing metadata associated with each port, and wherein determining groups of related applications comprises:
for each port:

determining, by an application relationship module, related applications in the groups of related applications having a dependency relationship or having a correlated relationship, wherein applications have a correlated relationship when a common data path or registration ID of the metadata associated with the respective port exists between the applications, and have a dependency relationship when one application is a parent or child based on traffic between the applications associated with the respective port;

producing a matrix specifying each relationship between the applications using the relationships, wherein the matrix includes a subset of the correlated relationships and a subset of the dependency relationships, wherein producing the matrix places a higher priority on correlated relationships compared dependency relationships;

subsequent to producing the matrix, assigning a priority to each of the applications, wherein assigning a priority to each application comprises:

identifying properties of the applications; and for each application, based on the properties, assigning the priority to the application, by a slicing customizer, by using predetermined rules to calculate the priority to the application based on tolerance for downtime, size of the application, and type of data in the application;

placing, by the slicing customizer, the applications in appropriate network slice queues based on the assigned priorities of each of the applications and the matrix, wherein each of the network slice queues has a slice priority; and performing, by a network slicing controller, the migration of the applications from the source device to the target device using the network slice queues, wherein each of the network slice queues are migrated in order of the slice priority.

2. The method of claim 1, wherein the network slice queues include at least a high priority network slice and a normal priority network slice.

3. The method of claim 1, wherein the predetermined rules are implemented by an administrator of the slicing customizer.

4. The method of claim 1, wherein assigning the priority of an application comprises determining a priority class of the application.

5. The method of claim 4, wherein the priority class is one of at least three classes that are based on at least a tolerance of the application to downtime.

6. The method of claim 4, wherein the priority class is one of at least three classes that are based on at least a size of data needed for the application.

7. The method of claim 4, wherein the priority class is one of at least two classes that are based on the application's relationship to other applications.

8. The method of claim 1, wherein the application and its data are divided into portions which are each assigned to a slice queue.

9. The method of claim 1, wherein an entire application and its data are assigned to a single slice queue.

10. A non-transitory computer readable medium comprising computer readable program code, which when executed by a computer processor enables the computer processor to perform a method for performing a migration, the method comprising:

receiving a request to migrate a plurality of applications from a source device to a target device at a migrator, the migrator connected to the source device and the target device;

identifying relationships between the plurality of applications, wherein identifying relationships comprises:

retrieving an application identification (ID) for each application of the plurality of applications in the request;

retrieving port numbers used for each application of the plurality of applications;

identifying all applications by application ID using each port based on the port numbers;

determining groups of related applications of the plurality of applications based on applications using each port, wherein an application is related to another application by analyzing metadata associated with each port, and wherein determining groups of related applications comprises:

for each port:

determining, by an application relationship module, related applications in the groups of related applications having a dependency relationship or having a correlated relationship, wherein applications have a correlated relationship when a common data path or registration ID of the metadata associated with the respective port exists between the applications, and have a dependency relationship when one application is a parent or child based on traffic between the applications associated with the respective port;

producing a matrix specifying each relationship between the applications using the relationships, wherein the matrix includes a subset of the correlated relationships and a subset of the dependency relationships, wherein producing the matrix places a higher priority on correlated relationships compared dependency relationships;

subsequent to producing the matrix, assigning a priority to each of the applications, wherein assigning a priority to each application comprises:

identifying properties of the applications; and for each application, based on the properties, assigning the priority to the application, by a slicing customizer, by using predetermined rules to calculate the priority to the application based on tolerance for downtime, size of the application, and type of data in the application;

placing, by the slicing customizer, the applications in appropriate network slice queues based on the assigned priorities of each of the applications and the matrix, wherein each of the network slice queues has a slice priority; and performing, by a network slicing controller, the migration of the applications from the source device to the target device using the network slice queues, wherein each of the network slice queues are migrated in order of the slice priority.

11. The non-transitory computer readable medium of claim 10, wherein the network slice queues include at least a high priority network slice and a normal priority network slice.

12. The non-transitory computer readable medium of claim 10, wherein the predetermined rules are implemented by an administrator of the slicing customizer.

13. The non-transitory computer readable medium of claim 10, wherein assigning the priority of an application comprises determining a priority class of the application.

14. The non-transitory computer readable medium of claim 13, wherein the priority class is one of at least three classes that are based on at least a tolerance of the application to downtime.

15. The non-transitory computer readable medium of claim 13, wherein the priority class is one of at least three classes that are based on at least a size of data needed for the application.

16. The non-transitory computer readable medium of claim 13, wherein the priority class is one of at least two classes that are based on the application's relationship to other applications.

17. A system comprising:
at least two devices; and
a migrator which comprises:
  at least one processor;
  a storage device; and
  at least one memory that includes instructions, which when executed by the processor, perform a method for performing a migration of a plurality of applications between a first device and at least a second device of the at least two devices, the method comprising:
receiving a request to migrate a plurality of applications from a source device to a target device at a migrator, the migrator connected to the source device and the target device;
identifying relationships between the plurality of applications, wherein identifying relationships comprises:
  retrieving an application identification (ID) for each application of the plurality of applications in the request;
  retrieving port numbers used for each application of the plurality of applications;
identifying all applications by application ID using each port based on the port numbers;
  determining groups of related applications of the plurality of applications based on applications using each port, wherein an application is related to another application by analyzing metadata associated with each port, and wherein determining groups of related applications comprises:
for each port:
  determining, by an application relationship module, related applications in the groups of related applications having a dependency relationship or having a correlated relationship, wherein applications have a correlated relationship when a common data path or registration ID of the metadata associated with the respective port exists between the applications, and have a dependency relationship when one application is a parent or child based on traffic between the applications associated with the respective port;
producing a matrix specifying each relationship between the applications using the relationships, wherein the matrix includes a subset of the correlated relationships and a subset of the dependency relationships, wherein producing the matrix places a higher priority on correlated relationships compared dependency relationships; subsequent to producing the matrix, assigning a priority to each of the applications, wherein assigning a priority to each application comprises:
identifying properties of the applications; and
for each application, based on the properties, assigning the priority to the application, by a slicing customizer, by using predetermined rules to calculate the priority to the application based on tolerance for downtime, size of the application, and type of data in the application;
placing, by the slicing customizer, the applications in appropriate network slice queues based on the assigned priorities of each of the applications and the matrix, wherein each of the network slice queues has a slice priority; and
performing, by a network slicing controller, the migration of the applications from the source device to the target device using the network slice queues, wherein each of the network slice queues are migrated in order of the slice priority.

18. The system of claim 17, wherein the network slice queues include at least a high priority network slice and a normal priority network slice.

19. The system of claim 17, wherein the predetermined rules are implemented by an administrator of the slicing customizer.

20. The system of claim 17, wherein assigning the priority of an application comprises determining a priority class of the application.

* * * * *